United States Patent [19]

Van Denberg

[11] Patent Number: 4,566,719

[45] Date of Patent: Jan. 28, 1986

[54] SPACED AXLE-TO-BEAM CONNECTION FOR SUSPENSION OF THE RIGID BEAM TYPE

[75] Inventor: Ervin K. Van Denberg, Massillon, Ohio

[73] Assignee: Turner Quick Lift Corporation, Canton, Ohio

[21] Appl. No.: 581,128

[22] Filed: Feb. 17, 1984

[51] Int. Cl.⁴ ............................................. B60G 11/26
[52] U.S. Cl. .................................................. 280/711
[58] Field of Search ............... 280/149, 676, 678, 679, 280/681, 683, 684, 685, 687, 711, 716, 724, 725

[56] References Cited

U.S. PATENT DOCUMENTS

| 4,166,640 | 9/1979 | Van Denberg | 280/711 |
| 4,293,145 | 10/1981 | Taylor | 280/711 |
| 4,309,045 | 1/1982 | Raidel | 280/711 |

Primary Examiner—Joseph F. Peters, Jr.
Assistant Examiner—Ross Weaver
Attorney, Agent, or Firm—Geoffrey R. Myers

[57] ABSTRACT

A rigid, longitudinal beam-type suspension has its beam rigidly connected to the axle by an axle seat which does not directly contact the beam, but is spaced therefrom by a pair of longitudinally spaced lateral plates extending through the beam such that forces are minimized by the relatively wide spacing of the lateral plates and the design of their connecting mechanism with the axle seat.

26 Claims, 8 Drawing Figures

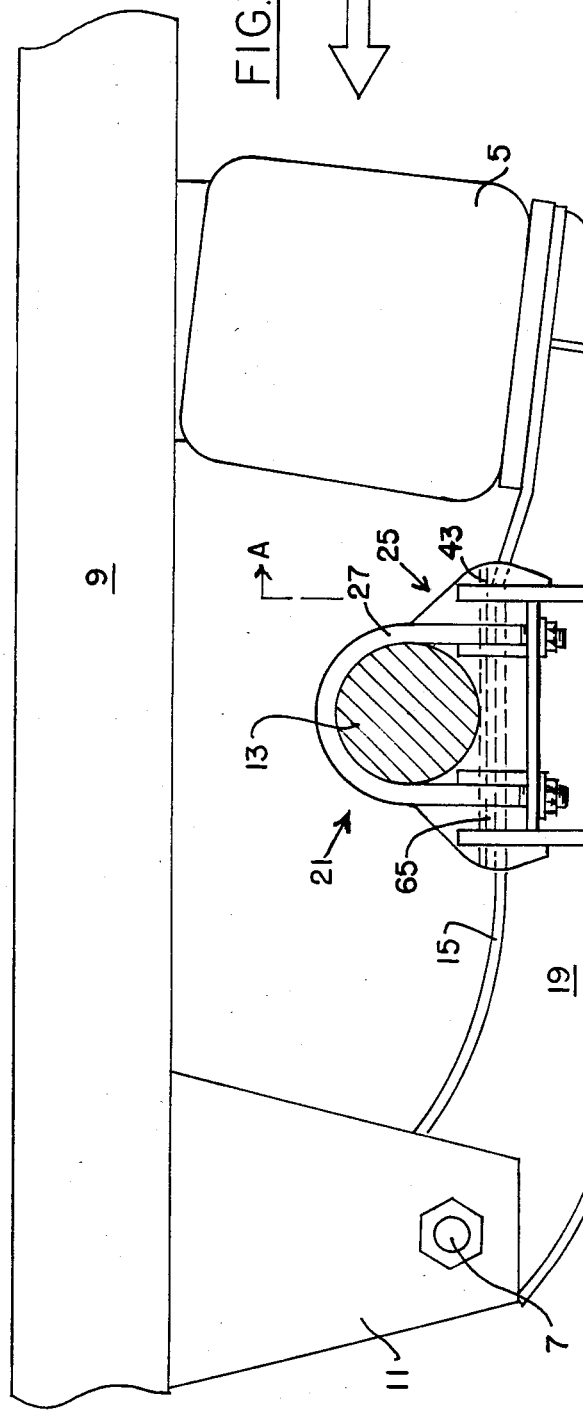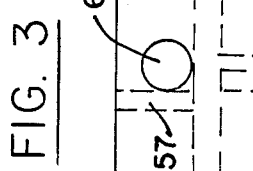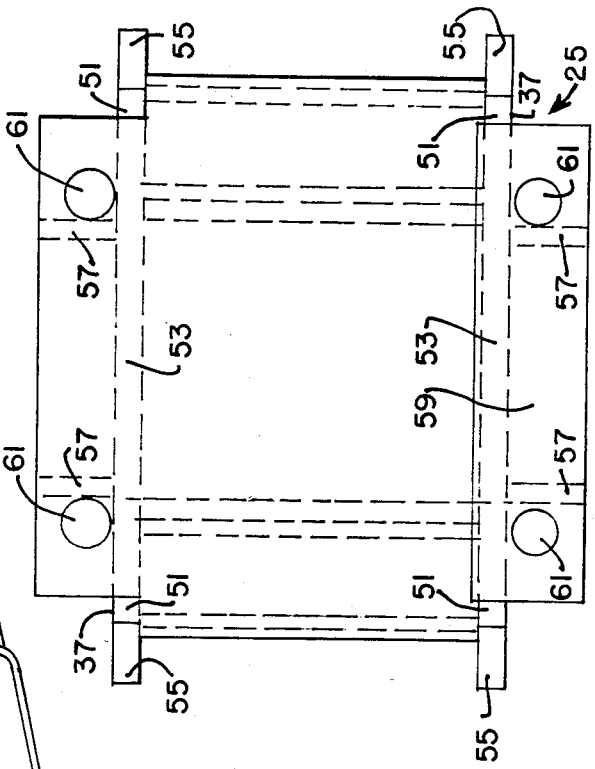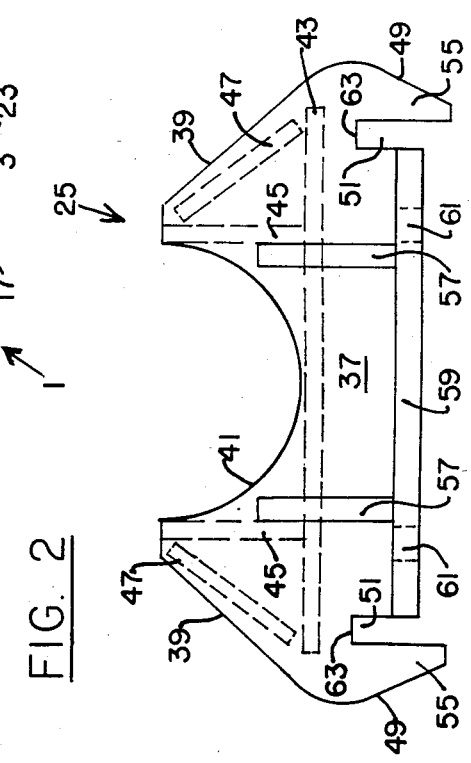

SPACED AXLE-TO-BEAM CONNECTION FOR SUSPENSION OF THE RIGID BEAM TYPE

BACKGROUND OF THE INVENTION

This invention relates to axle suspension systems for wheeled vehicles. More particularly, it relates to certain unique axle-to-beam connections for suspensions of the rigid beam type.

Axle suspension systems of the rigid beam-type have been successfully used for many years, particularly by that segment of the heavy duty trucking industry known as over-the-road haulers, a portion of which is often referred to in slang terms as "18-wheelers". Because of the rather unique roll stability (i.e. "roll-stiff") characteristics of rigid beam-type suspensions, they find high utility on heavy, over-the-road trailers, usually having four-wheeled tandems, and their accompanying ten-wheeled (rear-tandem) tractors that pull them. While applicable to a wide variety of end uses to which rigid beam-type suspensions are put, the subject invention finds particularly high utility on these tractor-trailer rigs used in over-the-road environments.

The rigid beam of a rigid beam-type suspension may assume many forms and configurations. As used herein, then, the term "rigid beam" is used in its generic industrial sense to denote a beam which extends longitudinally of the vehicle to stabilize the suspension and transmit the forces of operation sent to it from the axle, to the frame member of the vehicle to which the beam is attached.

Beams of the "rigid" type are distinguished from beams which consist of a single leaf or a few stacked leaves of a leaf spring such that the beam is flexible to the point where it takes up the large majority or substantially all of the articulation forces experienced during vehicle operation, thereby eliminating the need for resilient connections at either the axle connection point or the frame member connection point (or both). Included within the term "rigid beam", however, is a leaf spring arrangement which is of a sufficiently thick or non-flexible configuration such that resilient mountings are required at one or both of the aforementioned points.

Rigid beams, while denoted "rigid", do, of course, flex during operation of the vehicle. This flexing is, simply stated, less than that of a conventional, flexible leaf spring type of beam; thus requiring resilient mountings at either or both of the two aforementioned points. Not only do such beams flex during operation, but they must be allowed to flex or, given reasonable sizes and thicknesses, they will break during vehicle operation. Indeed, early attempts to rigidify connections in the beams either at the frame connecting member (e.g. a hanger bracket) or at the axle connection (or at both) without providing sufficient resiliency at one or both of the connections proved futile in that frequent beam breakage was experienced.

One early solution to this problem was to provide a relatively small resilient pivot bushing at the hanger bracket connection and to wrap the axle in a resilient bushing. While somewhat successful, wear-out of the resilient bushing members was a frequent problem. In addition, the axle seat could not be welded or rigidly connected to the beam. Rather, it was held to the beam by U-bolts or a clamping mechanism, alone. Thus, if the U-bolts or clamp failed, there was nothing to hold the axle to the beam.

In an attempt to remedy such a situation, various resilient pin bushings and axle, or axle connection, wraps were developed. One such attempt was a two-pin bushing connection. An example of such a connection is described in U.S. Pat. No. 3,332,701. In this device, a pair of longitudinally spaced pins are used to connect the axle seat to the beam. This allows the beam to flex to a degree, while providing the ability to rigidly connect the axle to its axle seat. The pins, however, must be provided with resilient wrap-around bushings, and a bushed pivot connection at the hanger bracket is also provided. Resilient bushings are prone to wear out, as discussed previously. The 2 pins, furthermore, constitute the only real means for holding the axle in the beam. Pin failure meant axle or beam loss because there was no redundancy. U-bolts, while they could conceivably be used, could only be used with difficulty, since the 2 spaced pins were usually at a place that would interfere with U-bolt connections.

In a relatively recent development by the subject inventor, a significant improvement was made over the then existing prior art by the use of a two-piece axle seat which wrapped around the beam. The axle seat, axle, and beam were clamped together by U-bolts. Bushings were not required at the axle-to-beam connection and the moments were reduced by a pair of horizontal, longitudinally spaced plates connected to the bottom plate member of the upper part of the two-piece axle seat. When assembled, the two horizontal, longitudinally spaced plates laid flat against the upper plate of the beam, thereby spacing the axle seat above the upper plate of the beam except for the two spaced contacts it made with the two plates. The axle seat could not, however, be directly welded to the beam for a truly rigid connection because the construction still impeded flexing of the beam enough to discourage direct rigid welding. Rather, the beam, through a unique axle alignment technique described in U.S. Pat. No. 4,261,597, was welded to a horizontal extension plate extending from the U-bolt flange of the axle seat. The horizontal extension plate was found to be sufficiently flexible when connected to the beam at a spaced distance from the seat, so that, in combination with the pair of longitudinally spaced horizontal plates serving to space the axle seat from the upper surface of the beam and the axle seat beam being U-bolted only to the beam, the beam was sufficiently flexible to attain highly advantageous wear and safety characteristics. While quite acceptable, there still was not achieved a true and fully rigid axle-to-beam connection, such that the axle seat became a truly integral part of the beam. The welding that could be done at the extension plate served as a back up to potential U-bolt failure, but was not maximal in this regard, since the amount of welding was small. In addition, the techniques involved required complexities not readily adaptable for field servicing and repair. Furthermore, the lower piece of the axle seat was a wrap-around connection which reduced clearance.

While prior units, as above described, have proven to be and are considered safe and effective for their intended purpose, it is apparent from the above that there exists a need in the art for a new axle-to-beam connection in which the axle seat becomes a truly integral part of the beam without the need for resilient bushings or resiliently bushed pins in the connection, and wherein U-bolts, or clamps, if used, become a redundancy for safety, rather than the primary means of connecting the axle seat to the beam.

This invention fulfills this and other needs in the art more apparent to the skilled artisan once given the following disclosure, by providing for the first time, an axle-to-beam connection wherein the axle seat can be rigidly connected to both the axle and beam while allowing the beam to flex, thereby to provide an axle-to-beam connection that is truly rigid and integral with the axle and beam.

Generally speaking, this is accomplished by providing an axle suspension system of the rigid, longitudinal beam-type for a wheeled vehicle, wherein said longitudinal beam is provided with a first means for connecting the beam to a frame member of the vehicle and a second means for connecting an axle to the beam at a location spaced from said first means, the improvement comprising as said second means, a pair of longitudinally spaced members extending laterally across and being rigidly attached to said beam and an axle seat having a first and a second surface, said first surface forming a rigid connection with said pair of longitudinally spaced members without contacting the beam, and said second surface rigidly connecting the axle to said axle seat, thereby to provide a rigid axle-to-beam connection in which said axle seat does not come into direct contact with said beam.

In certain preferred embodiments the suspension is connected to the frame member of the vehicle by a resilient bushing connection as disclosed in the subject inventor's U.S. Pat. No. 4,166,640 (e.g. FIGS. 5–8 and accompanying discussion). When such a connection is used, the resulting suspension presents to the art an exceedingly strong, highly roll and brake torque resistant, and long-wearing suspension having a wide variety of end uses, but particularly useful as a heavy duty trailer suspension for long mileage, over-the-road freight hauling trailers.

In still further preferred embodiments, the pair of longitudinally spaced members extending laterally across the beam are in the form of two trapezoids that have a common large base, and the axle seat comprises a pair of laterally spaced, longitudinally extending plate members of substantially the same configuration. This allows for several advantageous features. Firstly, by locating the shorter base end of one of the trapezoids of the lateral plates against the inner wall of the beam, and providing the shorter base of a dimension slightly less than the outside width of the side walls of the beam, a continuous weld between the side walls and bottom or top wall of the beam (i.e. the wall opposite that associated with the axle) may be obtained, as can a continuous weld between the side walls of the beam and the lateral plates. The lateral plates, in this way, become an integral part of the beam; yet there is very little interference with the flexing of the beam.

Secondly, by providing both the longitudinal and lateral plates with the same "double-abutting" trapezoid configuration, an eared overlap can be provided at the maximum width of both plates, with a uniform cross-sectional configuration between them in the area (or zone) of overlap, regardless of whether the view is taken from the lateral, or longitudinal plate. This maximizes strength and material efficiency, allows for the contact to be outboard of the side walls of the beam, allows welding of the contact joints, avoids axle seat contact with the beam, particularly the top and bottom plates thereof that must flex in tension and compression, and allows for maximized flexing of the laterally extending plates because of the outboard nature of the contact point. Thirdly, by providing a cutout in the lateral plates flush with or below the axle-side surface of the side walls of the beam, the plate of the beam immediately adjacent the axle may be a continuous plate, which because it is spaced from the axle seat, is free to flex naturally, despite the fully integral nature of the axle-to-beam connection.

This invention will now be described with reference to certain embodiments thereof, as illustrated in the accompanying Figures, wherein:

IN THE DRAWINGS

FIG. 1 is a side plan, partially sectionalized and X-ray view of an embodiment of the subject invention;

FIG. 2 is a side plan, partially sectionalized and X-ray view of the axle seat member shown in FIG. 1;

FIG. 3 is a bottom plan, X-ray view of the axle seat member shown in FIG. 2;

Figure 4:
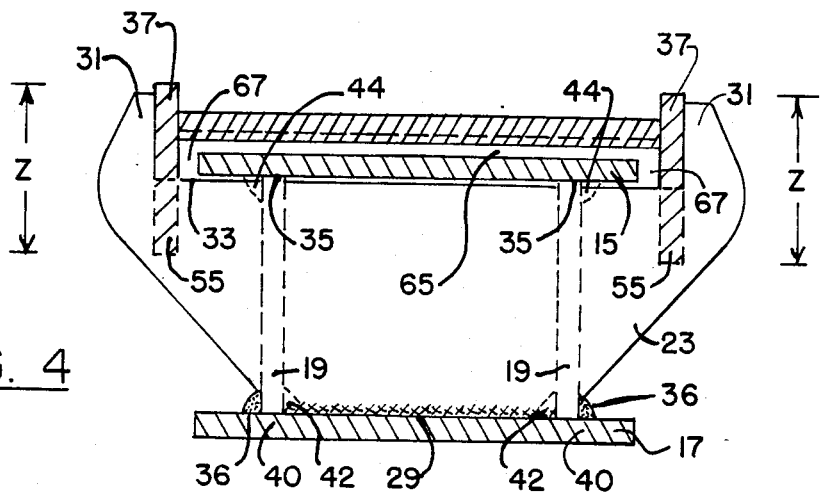
FIG. 4 is a sectional, end plan view taken along section line A—A in FIG. 1.

With reference first to FIG. 1, there is illustrated an advantageous environment for use of the concepts of this invention. Axle suspension system 1 is comprised of a rigid beam 3 having at one end thereof an air bag system 5 and at the other end a pivotal connection 7.

FIG. 1 shows one side of the suspension. The illustrated suspension is duplicated on the other side of the vehicle (not shown). The end of beam 3 containing the pivotal connection 7 is connected to longitudinal frame member 9 of the vehicle by hanger bracket 11. Axle 13 extends, in conventional fashion, laterally across the vehicle at right angles to longitudinally extending beam 3.

Beam 3 may assume many shapes and forms known in the art. In the illustrated embodiment, and with additional reference to FIG. 4, beam 3 is a rectangle comprised of top plate 15, bottom plate 17 and side plates 19. While these Figures illustrate axle 13 mounted above beam 3, it is understood that the axle can also be mounted under beam 3. In addition, while air bag 5 is shown offset from axle 13 along beam 3, it may also be aligned with axle 13. In short, to this point in the description, the suspension is conventional, and in preferred embodiments comprises the suspension disclosed in U.S. Pat. No. 4,166,640.

In accordance with this invention there is now provided in this otherwise conventional environment, a unique axle-to-beam connection 21. In the embodiment illustrated in FIGS. 1–6 axle-to-beam connection 21 comprises a pair of spaced, laterally extending plates 23, an axle seat 25 (best illustrated in FIGS. 2–3) and U-bolts 27.

Figure 5:
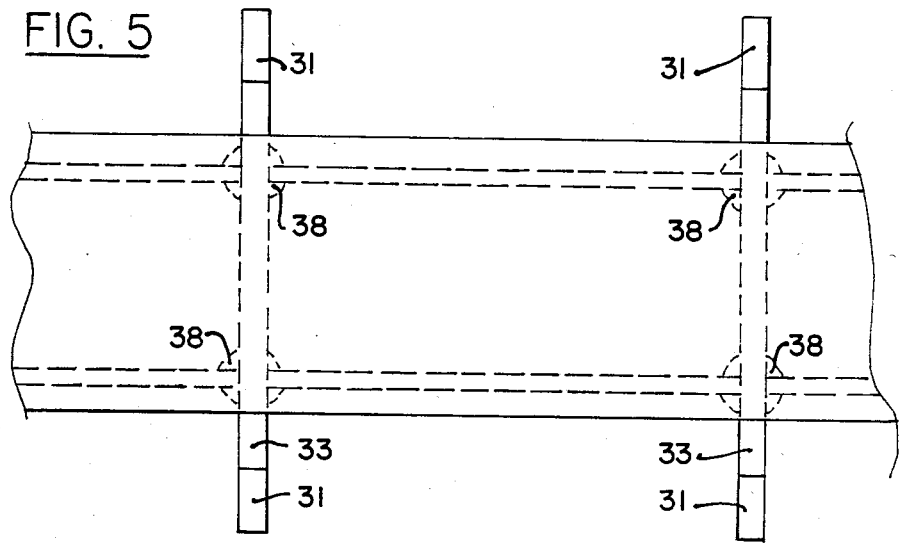
FIG. 5 is a partial top plan, X-ray view of the beam of FIG. 1, with a pair of laterally extending, longitudinally spaced plates installed therein.
Figure 6:
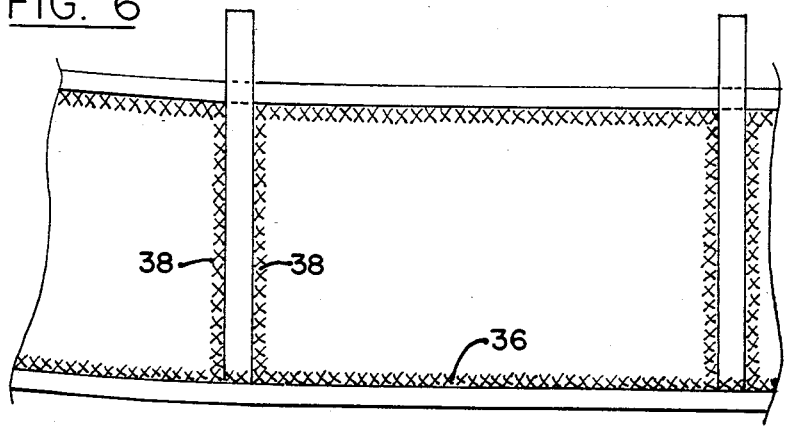
FIG. 6 is a side plan view of FIG. 5.

Plates 23, as illustrated in FIGS. 5–6, extend through side walls 19 of beam 3 to outboard locations beyond the peripheral edges of walls 19. In addition (see FIG. 4), plates 23 are in the shape of two abutting trapezoids having a common large base. The short, bottom base 29 of the lower trapezoid rests upon and may be optionally welded to bottom plate 17 of beam 3. The shorter base of the upper trapezoid is actually a rectangular cutout which forms a pair of ears 31 and a horizontal surface 33. By making the rectangle of the illustrated size, surface 33 is brought flush with or just slightly below the upper surfaces 35 of side walls 19. This allows upper plate 15 of beam 3 to extend as a continuous plate through connection 21 and beyond. By making the rectangle of sufficient length, as illustrated, axle seat 25 may rest upon surface 33 at points outboard of walls 19. By making the rectangle of the requisite depth, as illustrated, axle seat 25 is kept out of contact with any part of beam 3, and particularly upper plate 15 of beam 3, in a manner to be further discussed.

By such an arrangement, and through the requisite spacing of lateral plates 23 (e.g. in the dimensional proportions shown in the drawings) from each other, plates 23 become an integral part of beam 3 without adversely affecting its needed ability to flex during vehicle operation. The integral nature of the design is accomplished by fully welding all joints, as illustrated in FIGS. 4–6, except of course, for the inner joints formed by the last horizontal plate (e.g. either 15 or 17) of beam 3 when placed on the beam in completing it, since such, of course, can not be mechanically accomplished conveniently once beam 3 is a closed rectangle. In this respect, and as illustrated in FIG. 4, short base 29 is optionally, but preferably, of a width so as to be slightly less than the outside width between walls 19. This allows, as illustrated (e.g. FIGS. 4–6), a continuous outside weld 36 along bottom seam 40 of beam 3, as well as vertical welds 38 at all inside and outside seams. (The inside seams 42 opposite seams 40 may also be welded if desired. Outside seams 44 of the top plate 15 are also welded.) by, for example, making them of the same thickness as the various walls of beam 3 (e.g. $\frac{3}{8}''-\frac{1}{2}''$ steel). Since both plates 15 and 17 are continuous, and since flexible plates 23 are integral with side walls 19, sufficient flex is permitted in beam 3 to allow for a truly rigid axle-to-beam connection.

This rigid axle-to-beam connection is accomplished by an axle seat 25, as illustrated with particular reference to FIGS. 1–3. Axle seat 25 is formed of a pair of longitudinally extending, laterally spaced plates 37. Each plate 37 is in the form of two abutting trapezoids in a similar manner to plates 23. The short base of the upper trapezoid is formed of converging surfaces 39, and a surface 41 against which the axle will reside. Extending between plates 37, and located in the upper trapezoid region thereof, are a series of cross-members in the form of reinforcing horizontal plate 43, a pair of vertical plates 45, and a hypotenuse plate 47 extending between each respective plate 43 and 45.

The lower trapezoid of each plate 37 is formed of converging surfaces 49, a rectangular cutout 51 slightly larger in width than the thickness of plates 23, and a lower surface 53. Rectangular cutout 51 provides an aligning and seating mechanism for plates 23. By this configuration there are formed in each plate 37 a pair of ears 55 which are of the same or substantially the same dimensions as ears 31 in plates 23.

Attached to the outboard side walls of plates 37 are vertical reinforcing gussets 57 and horizontal flange member 59. Orifices 61 are provided in flange member 59 for accommodating the legs of U-bolts 27.

FIGS. 1 and 4 illustrate the unique, rigid connection made between plates 23 and 37. This is accomplished by the placement of plates 23 at right angles to plates 37 and sliding respective ears 31 and 55 into abutting engagement within aligning cutout rectangle 51 until horizontal surfaces 33 of plates 23 contact upper surface 63. In this location, ears 31 and 55 are in full abutting engagement with each other and a zone "Z" of overlap is created in which the cross-sectional configuration and dimensions of the ears are the same regardless of which view is taken. In addition, the horizontal surface of contact, marked by the abutment of surfaces 33 with 63 is at the approximate common base of the two abutting trapezoids of each plate, where maximum lateral width of the plates exists. This adds significant strength to the interconnection. The plates 23 and 37 are then rigidly joined by welding the mutual seams at ears 31 and 55.

With the plates 23 and 37 so connected, it can be seen that a gap 65 is created between horizontal plate 43 and top beam plate 15. In addition, plates 37 never touch any portion of beam 3 since they are located beyond the peripheral edges of even top plate 15, leaving a gap 67 on either side thereof which is actually a continuation of gap 65.

Axle 13 is mounted to axle seat 25 by locating it in surface 41 having the same cross-sectional shape as axle 13. Axle 13 is then rigidly welded into place in a known manner (e.g. see welds 46 in FIGS. 7–8). When such is accomplished, there is provided for the first time, a fully rigid axle-to-beam connection which is sufficiently strong and adequate, under proper loads, to retain the axle and allow beam 3 to flex. As a redundancy for safety, U-bolts 27 may be added. When they are so used, U-bolts 27 (FIG. 1) torqued in known fashion, serve two purposes. Firstly, they act as a back up to weld failure, should it occur. Secondly, they serve to put many of the important welds in compression or shear, rather than tension; thus adding further strength to the system.

Figure 7:
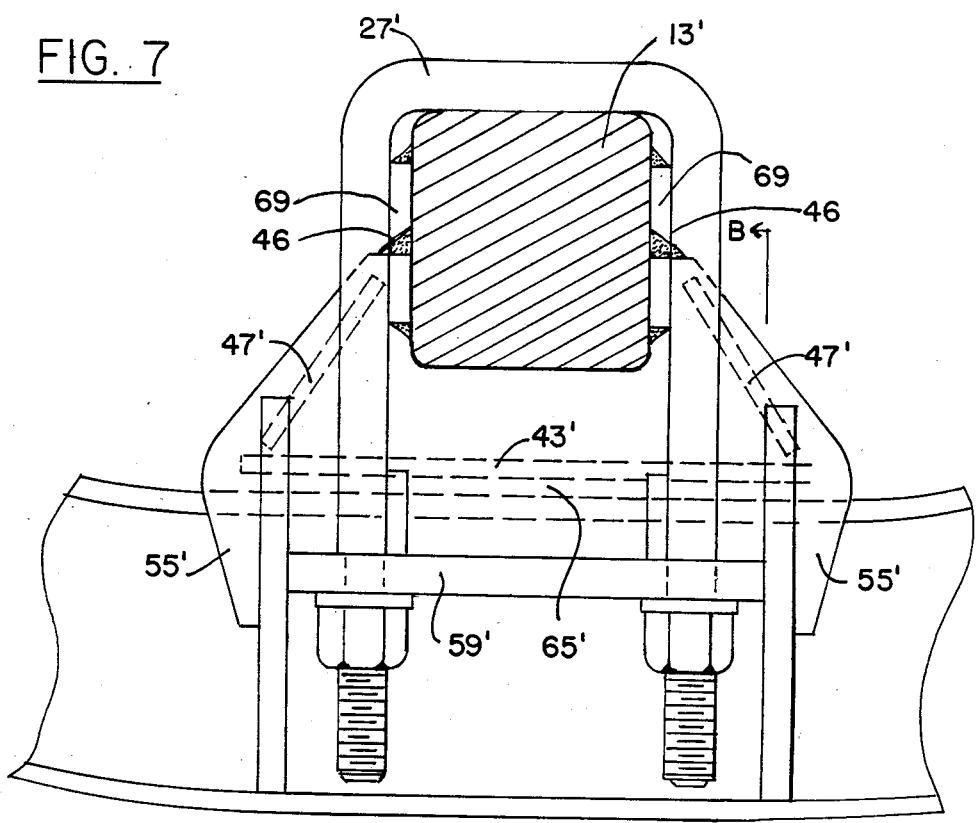
FIG. 7 is a side plan, partially sectional and X-ray view of another embodiment of this invention.
Figure 8:
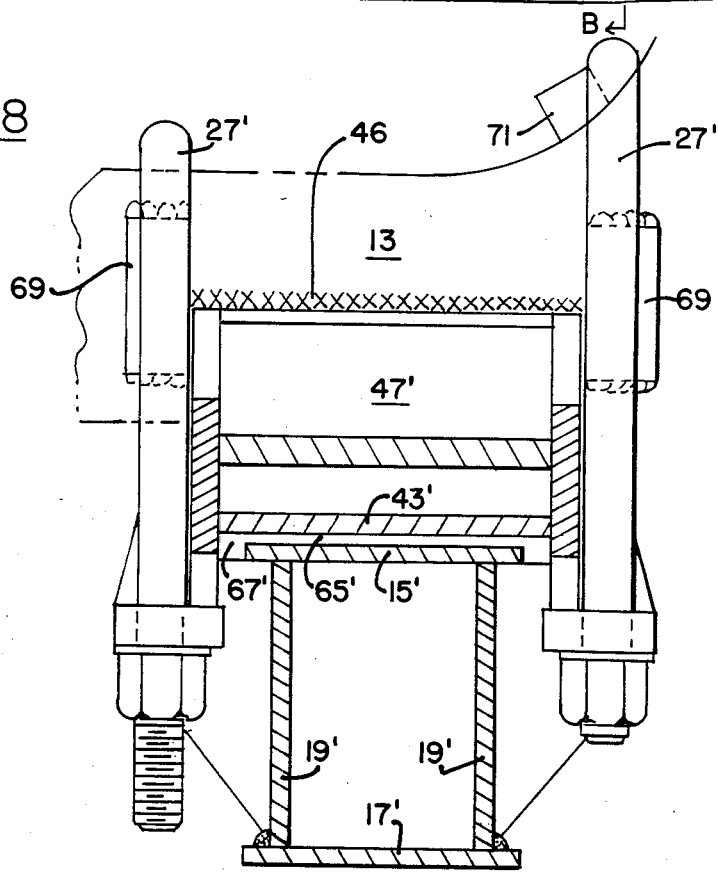
FIG. 8 is an end plan, sectional view taken along sectional line B—B in FIG. 7.

FIGS. 7 and 8 are presented to show the above-described invention adapted to a rectangular axle rather than a circular one. In such a configuration, shims 69 are used between axle 13' and U-bolts 27'. In addition, as illustrated in FIG. 8, if axle 13' is, for example, of changing cross-section (e.g. a drive axle), then stop member 71 may be provided to prevent lateral sliding of U-bolt 27'.

Once given the above disclosure, many other features, modifications and improvements will become apparent to the skilled artisan. Such features, modifications and improvements are, therefore, considered to be a part of this invention, the scope of which is to be determined by the following claims:

I claim:

1. In an axle suspension system of the rigid, longitudinal beam-type for a wheeled vehicle, wherein said longitudinal beam is provided with a first means for connecting the beam to a frame member of the vehicle and a second means for connecting an axle to the beam at a location spaced from said first means, the improvement comprising as said second means, a pair of longitudinally spaced members extending laterally across and being rigidly attached to said beam, and an axle seat having a first and a second surface, said first surface forming a rigid connection with said pair of longitudinally spaced members without contacting the beam, and said second surface rigidly connecting the axle to said axle seat, thereby to provide a rigid axle-to-beam connection in which said axle seat does not come into direct contact with said beam.

2. An axle suspension system according to claim 1 wherein said axle seat comprises a pair of laterally spaced, longitudinally extending plate members.

3. An axle suspension system according to claim 2 wherein said pair of longitudinally spaced members extending laterally across said beam comprise a pair of lateral plate members whose ends extend outwardly beyond the sides of the beam, and wherein said axle seat is connected to said longitudinally spaced members by said pair of laterally spaced plate plate members contacting said respective lateral plate members at a location beyond the sides of the beam.

4. An axle suspension system according to claim 3 wherein said first means for connecting the beam to a frame member of the vehicle is a resilient means and said second means rigidly connects the axle to the beam.

5. An axle suspension system according to claim 4 wherein said axle seat further comprises a lateral plate member extending between said pair of longitudinally extending plate members at a point spaced from said first surface, thereby to be spaced a finite, non-contacting distance from said beam.

6. An axle suspension system according to claim 5 wherein each of said pair of longitudinally extending plate members has extending outwardly therefrom a flange having at least two orifices therein, and said axle is retained in said axle seat, at least in part, by a U-bolt for each such flange, whose base extends about said axle and whose legs are secured in said orifices.

7. An axle suspension system according to claim 6 wherein said axle is welded to the second surface of said axle seat.

8. An axle suspension system according to claim 7 wherein said flanges are reinforced by web members extending between said flange and its respective longitudinally extending plate member.

9. An axle suspension system according to claim 8 wherein said pair of laterally extending plates and said longitudinally extending plates are provided with upwardly extending ear members at each of their ends, such that when respective plates are connected said ear members contact and extend along the face of their adjacent plate.

10. An axle suspension system according to claim 9 wherein said beam is a rigid, hollow beam.

11. An axle suspension system according to claim 10 wherein said beam is provided with an air bag.

12. In a wheeled vehicle having a pair of longitudinally extending frame members to which there is attached an axle suspension system, the improvement comprising the axle suspension system of claim 1.

13. In a wheeled vehicle having a pair of longitudinally extending frame members to which there is attached an axle suspension system, the improvement comprising the axle suspension system of claim 4.

14. In a wheeled vehicle having a pair of longitudinally extending frame members to which there is attached an axle suspension system, the improvement comprising the axle suspension system of claim 11.

15. An axle-to-beam connection for connecting an axle of a vehicle to a beam of a rigid beam-type suspension connected to the vehicle, said connection comprising a first pair of longitudinally spaced plates laterally extending within and laterally across said beam and being rigidly connected in said beam so as to become an integral part thereof, but extending outboard of said beam, and a second pair of laterally spaced, longitudinally extending plates having a first surface for rigidly connecting an axle thereto and a second surface for contacting said first pair of plates, said lateral spacing of said second pair of plates being sufficient such that when said second pair of plates are connected to said first pair of plates, said second pair of plates do not contact said beam, said first and said second pair of plates being rigidly connected, thereby to form a rigid beam-to-axle connection.

16. An axle-to-beam connection according to claim 15 wherein each of said first and second plates are in the form of abutting trapezoids having a common large base.

17. An axle-to-beam connection according to claim 16 wherein said trapezoids have within one of their shorter bases a cutout so as to form a pair of opposing ears so located that when a first plate contacts its respective second plate, respective ears of said plate are brought into abutting engagement.

18. An axle-to-beam connection according to claim 17 wherein one pair of plates is provided with a pair of vertical aligning grooves of slightly greater width than the opposing plate which is to be connected to it, and said other pair of opposing plates are connected to said pair of plates by being located in said vertical aligning grooves.

19. An axle-to-beam connection according to claim 18 wherein said pair of plates is said second pair of plates, and when said plates are connected, their connection is located outboard of the peripheral side walls of said beam.

20. An axle-to-beam connection according to claim 19 wherein said beam is a hollowed wall beam, and said second pair of plates make no contact with any of the said walls of the beam when connected to said first pair of plates.

21. An axle-to-beam connection according to claim 20 wherein said first pair of plates have a short base opposite the short base in which the cutout is located which is of a dimension and is so located as to be located within the lateral confines of the peripheral side walls of the beam.

22. An axle-to-beam connection according to claim 21 wherein said beam is comprised of a four-plate rectangle, formed of a continuous top and bottom plate, and wherein said short base of said first plates located within the confines of said side walls abuts one of said top or bottom plate, and such top or bottom plate is connected by a continuous weld to its respective side walls.

23. An axle-to-beam connection according to claim 19 wherein said second pair of plates are connected by cross-members which do not contact said beam when said first and second pair of plates are connected.

24. An axle-to-beam connection according to claim 23 wherein said first and second pair of plates are formed of opposing ears in one of said trapezoids which abut and overlap with each other when said first and second pair of plates are connected.

25. An axle-to-beam connection according to claim 24 wherein said ears are of substantially the same shape and size and said area of overlap is of substantially the same cross-sectional dimension regardless of which ear is viewed.

26. An axle-to-beam connection according to claim 16 wherein the first and second pair of plates contact each other at substantially the common base of each pair of plates' two abutting trapezoids.

* * * * *